US011823493B2

(12) United States Patent
Watanabe

(10) Patent No.: US 11,823,493 B2
(45) Date of Patent: Nov. 21, 2023

(54) IMAGING DEVICE, ELECTRONIC DEVICE, AND IMAGING METHOD

(71) Applicant: SONY SEMICONDUCTOR SOLUTIONS CORPORATION, Kanagawa (JP)

(72) Inventor: Goshi Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 63 days.

(21) Appl. No.: 17/310,558

(22) PCT Filed: Jan. 23, 2020

(86) PCT No.: PCT/JP2020/002243
§ 371 (c)(1),
(2) Date: Aug. 11, 2021

(87) PCT Pub. No.: WO2020/170705
PCT Pub. Date: Aug. 27, 2020

(65) Prior Publication Data
US 2022/0101653 A1 Mar. 31, 2022

(30) Foreign Application Priority Data
Feb. 19, 2019 (JP) .................................. 2019-027832

(51) Int. Cl.
*G06V 40/20* (2022.01)
*G06T 7/215* (2017.01)
(Continued)

(52) U.S. Cl.
CPC .......... *G06V 40/20* (2022.01); *G06T 1/0007* (2013.01); *G06T 7/215* (2017.01); *G06V 10/74* (2022.01);
(Continued)

(58) Field of Classification Search
CPC ........ G06V 40/20; G06V 10/74; G06V 40/23; G06V 10/96; G06T 1/0007; G06T 7/215;
(Continued)

(56) References Cited

U.S. PATENT DOCUMENTS

2009/0231453 A1   9/2009 Haung
2012/0249826 A1  10/2012 Kobayashi
(Continued)

FOREIGN PATENT DOCUMENTS

JP    2001330882 A   11/2001
JP    2009-200713 A   9/2009
(Continued)

OTHER PUBLICATIONS

International Search Report and Written Opinion of PCT Application No. PCT/JP2020/002243, dated Apr. 14, 2020, 08 pages of ISRWO.

*Primary Examiner* — Stephen P Coleman
(74) *Attorney, Agent, or Firm* — CHIP LAW GROUP

(57) ABSTRACT

To provide an imaging device and an electronic device capable of capturing a motion of a subject at a moment desired by a user in the motions of the subject. A CIS (2), which is an example of an imaging device according to the present disclosure, includes an imaging unit (5), a memory (6), a detection unit (83), and a decision unit (84). The imaging unit (5) continuously captures images of the subject to generate image data. The memory (6) stores image data. The detection units (83) detects motions of the subject based on the image data. The decision unit (84) decides the image data in which the motion of the subject in a direction matching the moving direction of the subject predicted based on the image data has been detected by the detection unit, as image data to be saved in the memory.

17 Claims, 7 Drawing Sheets

(51) Int. Cl.
*G06V 10/74* (2022.01)
*G06T 1/00* (2006.01)
*H04N 23/61* (2023.01)
*H04N 23/63* (2023.01)
*H04N 23/667* (2023.01)
*H04N 23/67* (2023.01)

(52) U.S. Cl.
CPC ............. *H04N 23/61* (2023.01); *H04N 23/63* (2023.01); *H04N 23/667* (2023.01); *H04N 23/675* (2023.01); *G06T 2207/20084* (2013.01); *G06T 2207/30196* (2013.01)

(58) Field of Classification Search
CPC . G06T 2207/20084; G06T 2207/30196; G06T 2207/10016; G06T 2207/20072; G06T 2207/30241; G06T 1/20; G06T 7/20; H04N 23/61; H04N 23/63; H04N 23/667; H04N 23/675; H04N 23/60; H04N 5/91; H04N 23/62; G03B 7/091; G03B 15/00
USPC ........................................................ 382/103
See application file for complete search history.

(56) References Cited

U.S. PATENT DOCUMENTS

| | | | |
|---|---|---|---|
| 2013/0241819 A1* | 9/2013 | Yamashita | G06V 40/28 |
| | | | 345/156 |
| 2014/0300774 A1 | 10/2014 | Gwak | |
| 2016/0073006 A1* | 3/2016 | Funamoto | H04N 23/675 |
| | | | 348/345 |
| 2016/0227104 A1 | 8/2016 | Guan et al. | |
| 2018/0012103 A1 | 1/2018 | Harada et al. | |
| 2018/0203518 A1* | 7/2018 | McCoy | G06V 20/20 |
| 2019/0094872 A1* | 3/2019 | Li | B60D 1/62 |

FOREIGN PATENT DOCUMENTS

| | | |
|---|---|---|
| JP | 2011030244 A | 2/2011 |
| JP | 2012-147355 A | 8/2012 |
| JP | 2014-120994 A | 6/2014 |
| JP | 2014191022 A | 10/2014 |
| JP | 2016-140030 A | 8/2016 |
| JP | 2016213548 A | 12/2016 |
| JP | 2017-055445 A | 3/2017 |
| JP | 2018-007156 A | 1/2018 |
| JP | 2018201095 A | 12/2018 |

* cited by examiner

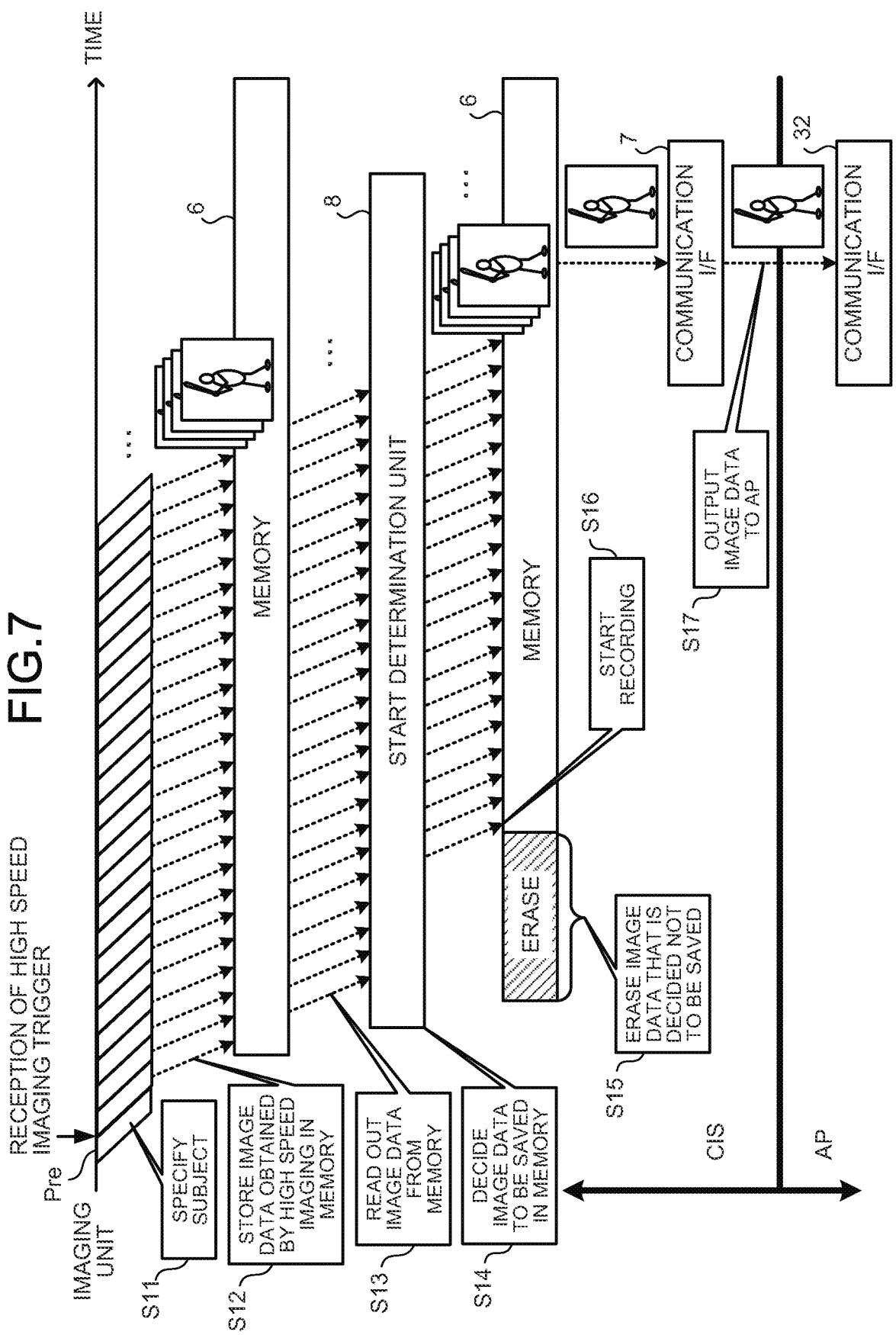

IMAGING DEVICE, ELECTRONIC DEVICE, AND IMAGING METHOD

CROSS REFERENCE TO RELATED APPLICATIONS

This application is a U.S. National Phase of International Patent Application No. PCT/JP2020/002243 filed on Jan. 23, 2020, which claims priority benefit of Japanese Patent Application No. JP 2019-027832 filed in the Japan Patent Office on Feb. 19, 2019. Each of the above-referenced applications is hereby incorporated herein by reference in its entirety.

FIELD

The present disclosure relates to an imaging device, an electronic device, and an imaging method.

BACKGROUND

There is an imaging device having a continuous imaging function capable of capturing a moving subject, specifically capturing a motion of the subject at a moment desired by the user in the motions of the subject, by continuously imaging the moving subject at high speed. For example, Patent Literature 1 describes an imaging device that controls to perform continuous imaging at a frame speed higher than a current frame speed when it is determined that an operation unit for continuous imaging is being pressed by the user and that controls to maintain the current frame speed when it is determined that the operation unit is not being pressed.

CITATION LIST

Patent Literature

Patent Literature 1: JP 2012-147355 A

SUMMARY

Technical Problem

However, there are cases where the imaging device cannot image the motion of the subject at a moment desired by the user in the motions of the subject when performing high speed continuous imaging. Therefore, the present disclosure proposes an imaging device, an electronic device, and an imaging method capable of imaging a motion of a subject at a moment desired by the user in the motions of the subject.

Solution to Problem

An imaging device according to the present disclosure includes an imaging unit, a memory, a detection unit, and a decision unit. The imaging unit continuously captures images of the subject to generate image data. The memory stores image data. The detection units detects motions of the subject based on the image data. The decision unit decides the image data in which the motion of the subject in a direction matching the moving direction of the subject predicted based on the image data has been detected by the detection unit, as image data to be saved in the memory.

BRIEF DESCRIPTION OF DRAWINGS

FIG. 7 is an operation diagram of a CIS according to the second embodiment.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

1. First Embodiment

[1-1. Configuration of Electronic Device According to First Embodiment]

Figure 1:
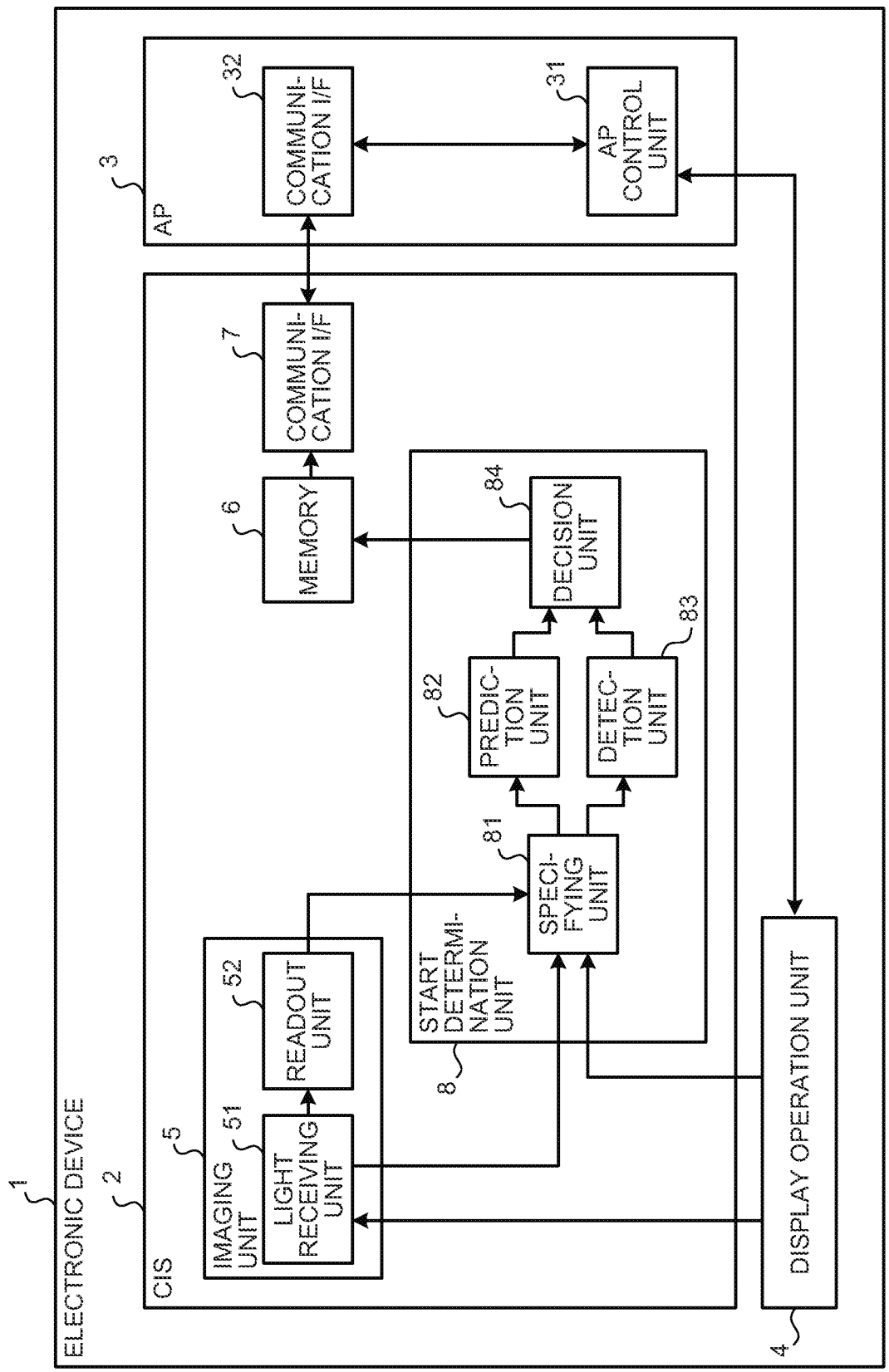
FIG. 1 is a block diagram illustrating a schematic configuration example of an electronic device according to a first embodiment.

FIG. 1 is a block diagram illustrating a schematic configuration example of an electronic device according to a first embodiment. An electronic device 1 illustrated in FIG. 1 is a device that captures a still image or a moving image, and an example this includes a digital camera and a digital video camera, or a tablet terminal, a smartphone, or the like, having a camera function.

As illustrated in FIG. 1, the electronic device 1 includes a Complementary Metal Oxide Semiconductor (CMOS) image sensor (hereinafter referred to as a CIS 2), an application processor (hereinafter referred to as an AP 3), and a display operation unit 4.

The display operation unit 4 is a touch panel liquid crystal display having a function of displaying an image and a function of receiving touch operations by a user. Alternatively, the electronic device 1 may include: a liquid crystal display for displaying an image; and an operation switch for receiving touch operations by the user, instead of the display operation unit 4.

As an example of an imaging device having a one-chip configuration, the CIS 2 captures an image, and outputs image data of the captured image to the AP 3. In addition to the function of capturing a normal still image or moving image, the CIS 2 has a high speed imaging function of continuously imaging a subject at high speed (hereinafter referred to as high speed imaging). The imaging device according to the present disclosure is not limited to the CIS 2, and may be other image sensors such as a Charge Coupled Device (CCD) image sensor.

The AP 3 includes: an AP control unit 31 which is an example of a processor such as a Central Processing Unit (CPU) that executes various application programs according to applications of the electronic device 1; and a communication interface (I/F) 32 that performs information communication with the CIS 2.

The AP 3 performs, for example, correction processing and modification processing on the image data input from the CIS 2, as well as performing display control processing for displaying image data on the display operation unit 4. In addition, by controlling to display the image data of the captured image captured at high speed by the CIS 2 on the display operation unit 4 in time series, the AP 3 can perform super slow playback of the motion of the subject moving at high speed.

Here, when a camera equipped on a general electronic device such as a smartphone performs high speed imaging, the CIS continuously images the subject at high speed, and stores image data of the captured images in the memory in time series.

Unfortunately, however, an electronic device has an upper limit on the capacity of the memory for storing image data. For this reason, there might be a case, in a general electronic device, for example, where the amount of image data of the captured image reaches the upper limit of the capacity of the memory before arrival of a moment desired by the user in the motions of the subject when the user's operation timing of starting high speed imaging is too early.

In such a case, even when the image data captured at high speed is played back on the electronic device at super slow speed, the playback of the image at a moment desired by the user in the motions of the subject might be difficult because image data capturing the motion at the moment desired by the user in the motions of the subject is not stored in the memory. In this manner, there is a case where capturing the motion of the subject at the moment desired by the user in the motions of the subject is not possible with a general electronic device.

Therefore, the CIS 2 according to the present disclosure has a configuration capable of capturing the motion of the subject at a moment desired by the user even when the user's operation for starting high speed imaging is too early. Specifically, the CIS 2 includes an imaging unit 5, a memory 6, a communication I/F 7, and a start determination unit 8.

The imaging unit 5 includes a light receiving unit 51 and a readout unit 52. The light receiving unit 51 includes: an optical system equipped with a zoom lens, a focus lens, an aperture, or the like; and a pixel array unit having a configuration in which unit pixels including light receiving elements such as photodiodes are arranged in a two-dimensional matrix, for example.

The light receiving unit 51 uses the optical system to form an image of light incident from the outside, on a light receiving surface of the pixel array unit. By performing photoelectronic conversion of the light incident on the light receiving element, each of unit pixels of the pixel array unit readably accumulates the electric charge corresponding to the amount of the incident light.

The readout unit 52 includes: a readout circuit that reads out the electric charge accumulated in each of the unit pixels as a pixel signal; and an Analog to Digital Converter (ADC) that generates digital image data by converting an analog pixel signal read out by the readout circuit, into a digital value. The readout unit 52 outputs the generated image data to the start determination unit 8 in units of one frame of images.

The imaging unit 5 has an autofocus (AF) function. When focusing (focus point setting) is achieved on a subject by the AF function, the imaging unit 5 outputs information indicating the position of the focus point in the captured image to the start determination unit 8.

When a signal indicating that the imaging operation has been performed by the user is input from the display operation unit 4, the imaging unit 5 captures a still image or a moving image. Furthermore, the imaging unit 5 starts high speed imaging when it has received a signal (hereinafter, referred to as a high speed imaging trigger) indicating that the user has performed a high speed imaging start operation on the display operation unit 4.

The start determination unit 8 erases the image data captured before the image data that the user is likely to desire to capture among the image data obtained by high speed imaging input from the imaging unit 5, and selectively stores the image data that the user is likely to desire to capture, in the memory 6.

With this configuration, the start determination unit 8 can image the motion of the subject at a moment desired by the user even when the user's operation for starting high speed imaging is too early. The start determination unit 8 includes, for example, a microcomputer having a Central Processing Unit (CPU), a Read Only Memory (ROM), a Random Access Memory (RAM) or the like, and various circuits.

The start determination unit 8 includes: a specifying unit 81, a prediction unit 82; a detection unit 83; and a decision unit 84, configured to function by execution, by the CPU, programs stored in the ROM using RAM as a work area.

Note that the specifying unit 81, the prediction unit 82, the detection unit 83, and the decision unit 84 included in the start determination unit 8 may be partially or entirely formed with hardware devices such as an Application Specific Integrated Circuit (ASIC) or a Field Programmable Gate Array (FPGA).

The specifying unit 81, the prediction unit 82, the detection unit 83, and the decision unit 84 included in the start determination unit 8 individually execute the information processing described below. The internal configuration of the start determination unit 8 is not limited to the configuration illustrated in FIG. 1, and may be another configuration as long as it is a configuration that performs information processing described below.

The specifying unit 81 specifies a subject based on image data, and outputs information indicating the position of the subject in the image and the image data to the prediction unit 82 and the detection unit 83. The specifying unit 81 determines the composition of the image by Deep Neural Network (DNN) processing using a DNN and then decides a Region of Interest (ROI) region in which a subject is imaged, from the determined composition, and thereby specifies the subject.

The specifying unit 81 then outputs the information indicating the position of the ROI region in the image in which the subject has been specified, together with the image data in which the subject has been specified, to the prediction unit 82 and the detection unit 83. Incidentally, the specifying unit 81 can specify the subject by using various neural networks other than the DNN, such as a Recurrent Neural Network (RNN) and a Convolutional Neural Network (CNN). Furthermore, the specifying unit 81 may be configured to specify the subject by using a learning model trained by various other machine learning such as a decision tree or a support vector machine.

The prediction unit 82 predicts the moving direction of the subject by performing DNN processing using a DNN on the image data, for example. Incidentally, the prediction unit 82 can predict the moving direction of the subject by using various neural networks such as RNN and CNN as well as DNN.

Furthermore, the prediction unit 82 may be configured to predict the moving direction of the subject by using a learning model trained by various other machine learning such as a decision tree or a support vector machine. The prediction unit 82 predicts, for example, the moving direction of the swinging bat when the subject is a baseball batter, the travel direction when the subject is a car or train, the moving direction of limbs and hair when the subject is a running person, or the moving direction of the wings when the subject is a bird.

The prediction unit 82 outputs information indicating the predicted moving direction of the subject to the decision unit 84. The detection unit 83 detects motions of the subject based on the image data in time series, and outputs information indicating the motion of the subject (including the amount of motion and the moving direction) to the decision unit 84.

The decision unit 84 decides the image data to be saved in the memory 6 based on the information input from the prediction unit 82 and the detection unit 83, and outputs and stores the image data decided to be saved, to the memory 6. At this time, the decision unit 84 decides the image data in which the motion matching the moving direction of the subject predicted by the prediction unit 82 has been detected by the detection unit 83, as the image data to be saved in the memory 6.

Therefore, the memory 6 does not store, for example, image data that has no motion of subject due to early timing of starting the high speed imaging by the user and that thus need not be captured by high speed imaging, or image data in which the subject has moved in a direction different from the direction predicted by the prediction unit 82 due to camera shake or the like.

Furthermore, the memory 6 stores image data in which the subject moves in a direction matching the direction predicted by the prediction unit 82, the image data that the user is likely to desire to capture with high speed imaging. With this configuration, the CIS 2 can image the motion of the subject at a moment desired by the user even when the user's operation for starting high speed imaging is too early.

The memory 6 is a storage device such as a flash memory, for example, and stores in time series the image data representing the captured images input from the start determination unit 8. Having received an image data acquisition request from the AP 3, the communication I/F 7 outputs the image data stored in the memory 6 to the AP 3.

The AP control unit 31 outputs the image data input from the CIS 2 via the communication I/F 32, to the display operation unit 4 so as to display the image data. For example, when the display operation unit 4 has received an image display operation by the user, the AP control unit 31 outputs an image data acquisition request to the CIS 2 via the communication I/F 32, acquires the image data from the CIS 2 so as to display it on the display operation unit 4.

[1-2. Operation of Electronic Device According to First Embodiment]

Figure 2:
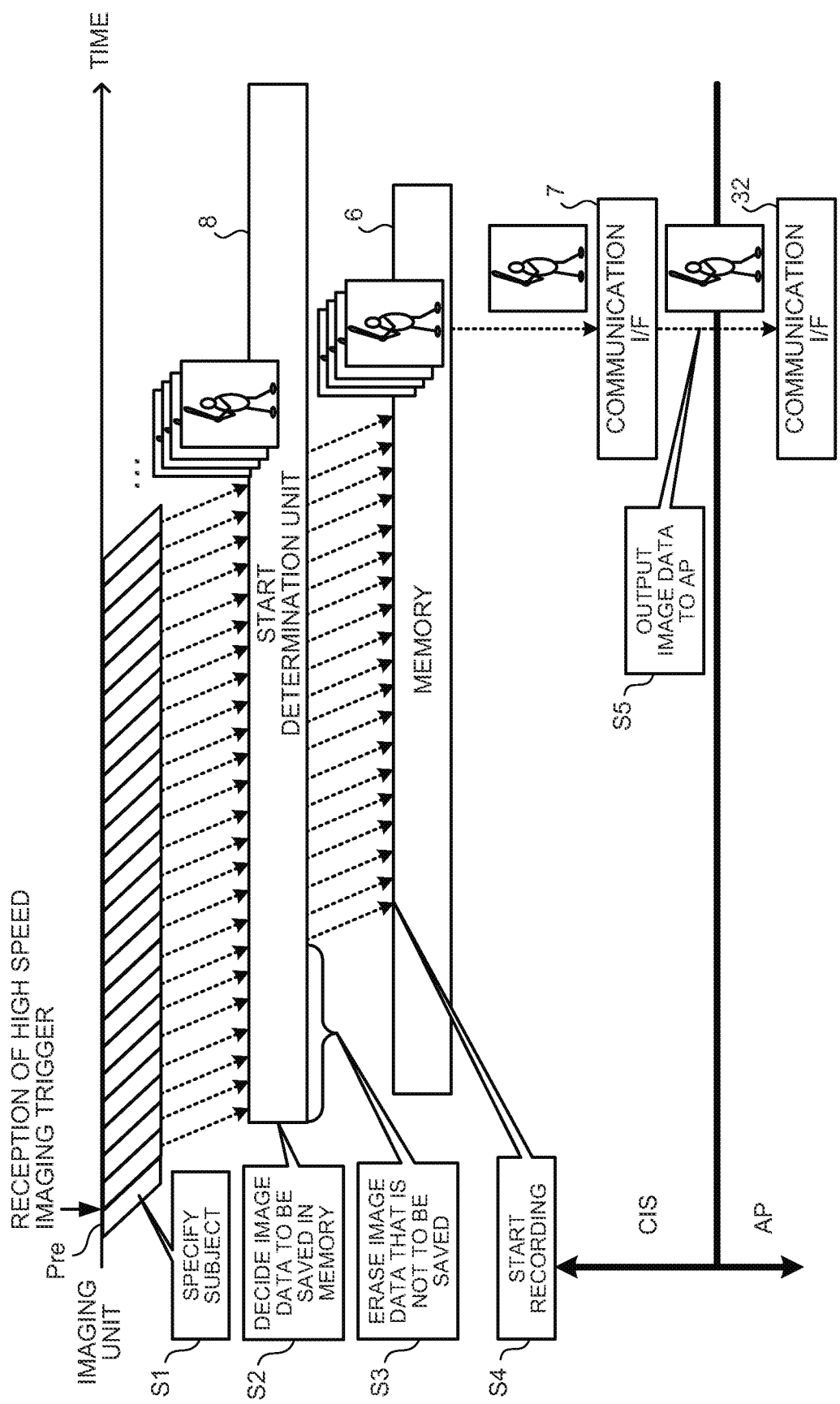
FIG. 2 is an operation diagram of a CIS according to the first embodiment.

Next, operations of the CIS according to the present disclosure will be described with reference to FIG. 2. FIG. 2 is an operation diagram of the CIS according to the present disclosure. As illustrated in FIG. 2, before starting high speed imaging, the CIS 2 initially specifies a subject from a preview image Pre by the start determination unit 8 (step S1).

Thereafter, when the CIS 2 has received a high speed imaging trigger and started high speed imaging, the start determination unit 8 acquires the image data captured at high speed from the imaging unit 5, and decides the image data to be saved in the memory 6 based on the image data before being stored in the memory 6 (step S2). At this time, the start determination unit 8 decides that the image data in which the moving direction of the subject matches the predicted direction, as the image data to be saved in the memory 6.

Furthermore, when there is no motion in the subject in the image at the beginning of high speed imaging due to early operation timing of starting the high speed imaging by the user, or when the moving direction of the subject is different from the predicted direction, the start determination unit 8 erases these pieces of image data that are not to be saved (step S3).

Subsequently, the start determination unit 8 selectively outputs the image data decided to be saved in the memory 6 out of all the image data acquired from the imaging unit 5 to the memory 6 and starts recording (step S4). With this configuration, CIS 2 would not have to record, in the memory 6, image data that needs no high speed imaging, such as image data in which there is no motion of subject in the image at the beginning of high speed imaging, making it possible to effectively use the storage capacity of the memory 6 for the image data that the user desires to capture with high speed imaging, by the unrecorded amount.

In addition, when the image obtained by high speed imaging is to be displayed on the display operation unit 4, the CIS 2 outputs the image data from the memory 6 to the communication I/F 32 of the AP 3 via the communication I/F 7 of the CIS 2 (step S5).

With this operation, by displaying the image data captured by high speed imaging input from the CIS 2 on the display operation unit 4 at a frame rate lower than an imaging rate, the AP 3 is capable of performing super slow playback of the image that has captured the motion of the subject at a moment desired by the user in the motions of the subject.

[1-3. Specific Examples of High Speed Captured Images]

Next, a specific example of the high speed captured image according to the present disclosure will be described. Here, a case where a user attempts to capture a subject at a moment of contact in hitting a ball with a baseball bat will be described. Furthermore, here, high speed imaging as a comparative example that does not perform image data erasure by the start determination unit 8 will be described first, and then, high speed imaging that performs image data erasure by the start determination unit 8 will be described.

Figure 3:
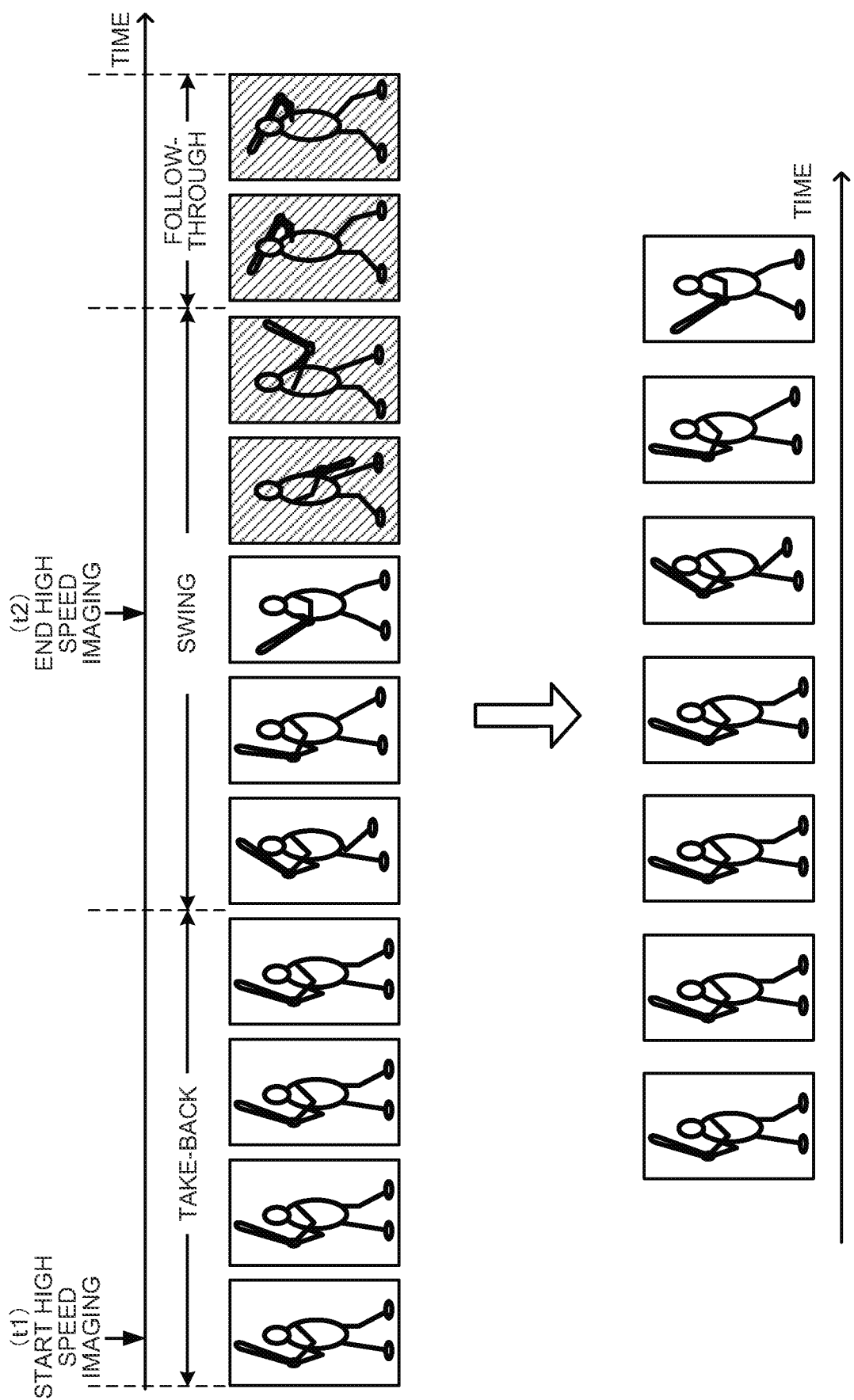
FIG. 3 is a diagram illustrating a high speed captured image according to a comparative example of the first embodiment.
Figure 4:
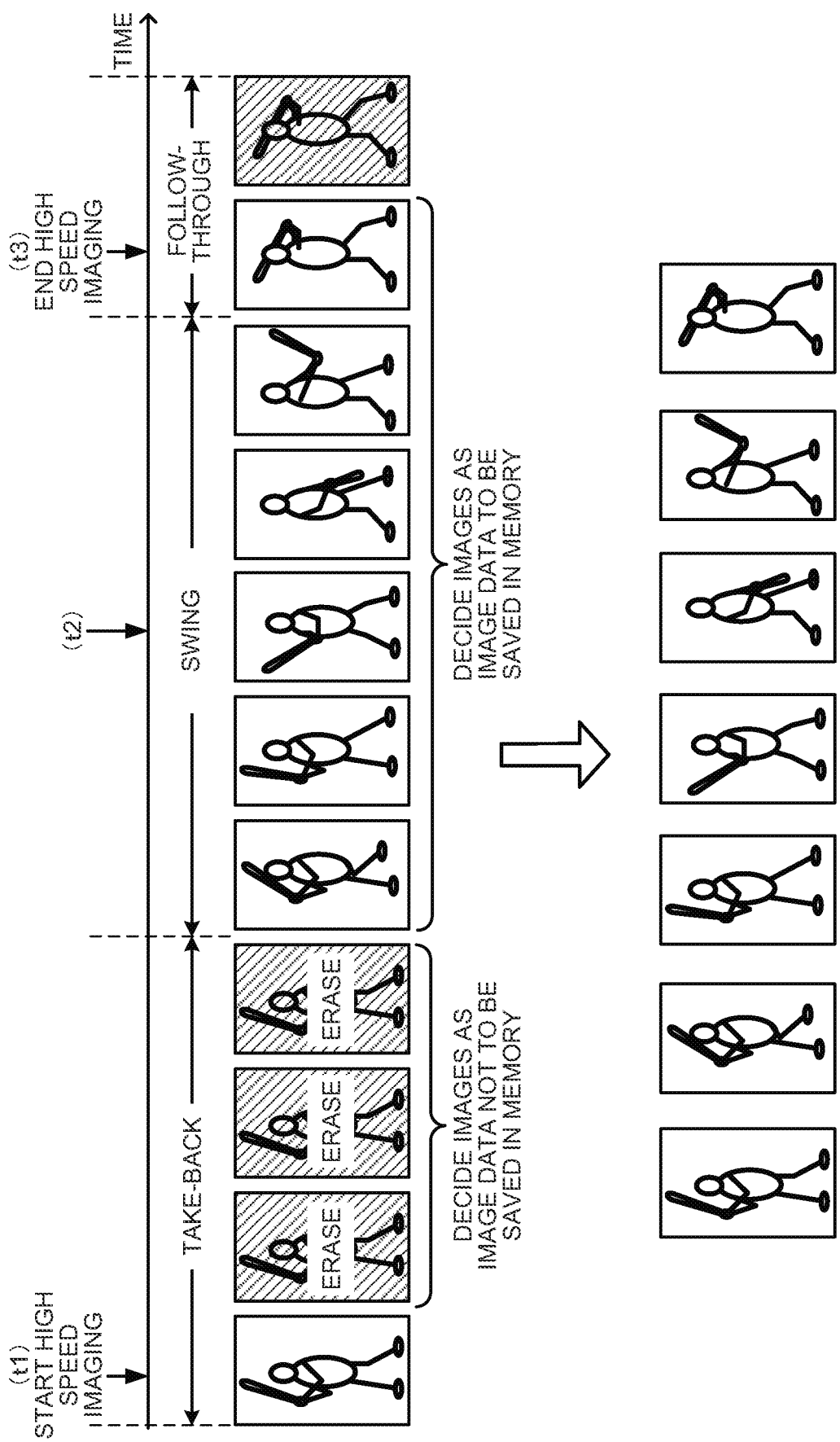
FIG. 4 is a diagram illustrating a high speed captured image according to the first embodiment.

FIG. 3 is a diagram illustrating a high speed captured image according to the comparative example of the present disclosure. FIG. 4 is a diagram illustrating a high speed captured image according to the present disclosure. Here, in order to facilitate understanding of the effects of the start determination unit 8, the number of image frames that can be stored in the memory 6 is described as seven frames, which is extremely smaller than the actual possible number.

As illustrated in the upper part of FIG. 3, the action of swinging a baseball bat includes a series of motions of take-back, swing, and follow-through. For example, when erasure of the image by the start determination unit 8 is not to be performed, the CIS 2 starts high speed imaging at time t1 and ends the high speed imaging at time t2, at a point of capturing the image of the seventh frame.

When playback of the high speed captured image captured in this manner is performed at super slow rate, the playback image is mostly an image of the subject being during take-back motion, as illustrated in the lower part of FIG. 3, and does not include the images during the swing and the moment of contact, which are desired by the user.

In contrast, the procedure in the case of performing erasure of images by the start determination unit 8 is, as illustrated in the upper part of FIG. 4, such that, after an image of the first frame is captured at time t1, the start determination unit 8 decides take-back images of second to fourth frames in which there is no motion of the subject, as the image data not to be saved in the memory 6. Subsequently, the start determination unit 8 erases the images of the second to fourth frames decided not to be saved.

The memory 6 has only stored one frame of image at this point, and thus, is capable of storing the remaining six frames of images. Since the subject enters the swing motion from the fifth frame, the motion of the subject in the direction matching the predicted direction is detected. Accordingly, the start determination unit 8 decides the images of fifth to tenth frames as images to be saved in the memory 6, stores the image data of the fifth to tenth frames in the memory 6, finishing the high speed imaging at time t3.

When playback of the high speed captured image captured in this manner is performed at a super slow mode, the playback image includes the images from the start to the end of the swing as illustrated in the lower part of FIG. 4, including the moment of contact desired by the user.

The playback images illustrated in the lower part of FIG. 4 are images obtained by thinning images of second to fourth frames, and thus, strictly speaking, the images are not super slow images that accurately express the actual motions of the subject. Still, the thinned second to fourth frame images are images including substantially no motion of the subject, and thus are not images in a period requiring high speed imaging.

Therefore, the playback images illustrated in the lower part of FIG. 4 are considered to be images that have achieved the intention of high speed imaging from the user's point of view, and are sensed by the user to be super slow images with extended imaging time. In this manner, according to the CIS 2, even when the user's operation of starting high speed imaging is too early, it is possible to image the motion of the subject at a moment desired by the user in the motions of the subject.

[1-4. Processes Executed by CIS]

Figure 5:
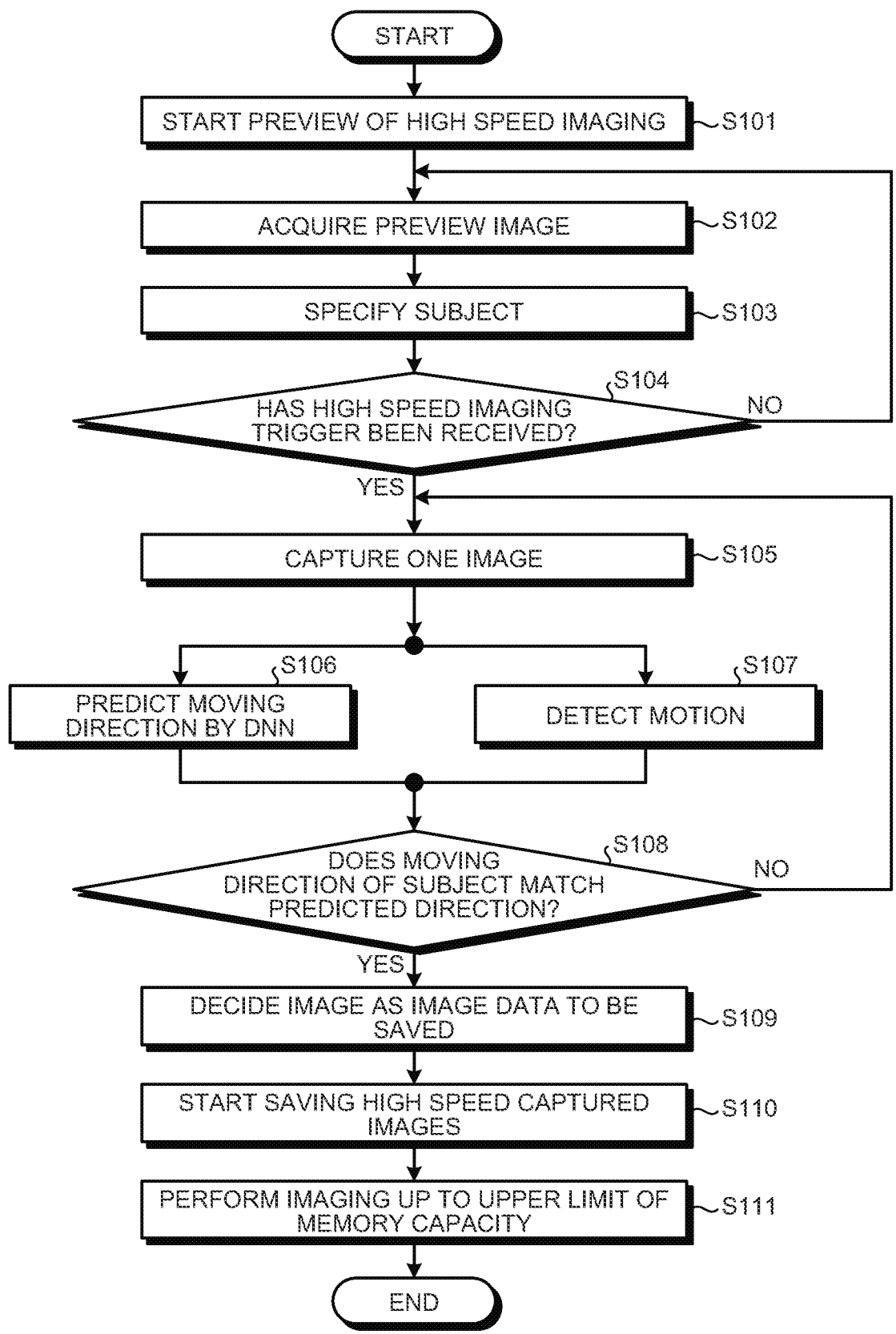
FIG. 5 is a flowchart illustrating an example of processing executed by the CIS according to the first embodiment.

Next, an example of processes executed by the CIS 2 according to the present disclosure will be described with reference to FIG. 5. FIG. 5 is a flowchart illustrating an example of processes executed by the CIS 2 according to the present disclosure.

The CIS 2 executes the process illustrated in FIG. 5 when the electronic device 1 is in a high speed imaging mode. Specifically, in the CIS 2, when the electronic device enters the high speed imaging mode, the imaging unit 5 first starts high speed imaging preview as illustrated in FIG. 5 (step S101). Here, the imaging unit 5 captures a preview image at a lower speed than the high speed imaging.

Subsequently, the start determination unit 8 acquires a preview image (step S102) and specifies the subject (step S103). Thereafter, the imaging unit 5 determines whether a high speed imaging trigger has been received (step S104).

Then, when the imaging unit 5 determines that the high speed imaging trigger has not been received (step S104, No), the imaging unit 5 proceeds to the process of step S102. Furthermore, when the imaging unit 5 determines that the high speed imaging trigger has been received (step S104, Yes), the imaging unit 5 starts high speed imaging and captures one image (step S105).

Thereafter, by using a DNN, the start determination unit 8 predicts the moving direction of the subject in the image (step S106). Furthermore, the start determination unit 8 detects the motion of the subject in the image in parallel with the process of step S106 (step S107).

The start determination unit 8 then determines whether the moving direction of the subject matches the predicted direction (step S108). When the start determination unit 8 determines that the moving direction does not match the predicted direction (step S108, No), the process proceeds to step S105.

Furthermore, when the start determination unit 8 determines that the moving direction matches the predicted direction (step S108, Yes), the start determination unit 8 decides the image data in which the motion is detected, as the image data to be saved (step S109). Thereafter, the start determination unit 8 starts saving of the high speed captured image (step S110). The imaging unit 5 performs imaging up to the upper limit of the capacity of the memory 6 (step S111), and ends the process.

2. Second Embodiment

[2-1. Configuration of Electronic Device According to Second Embodiment]

Figure 6:
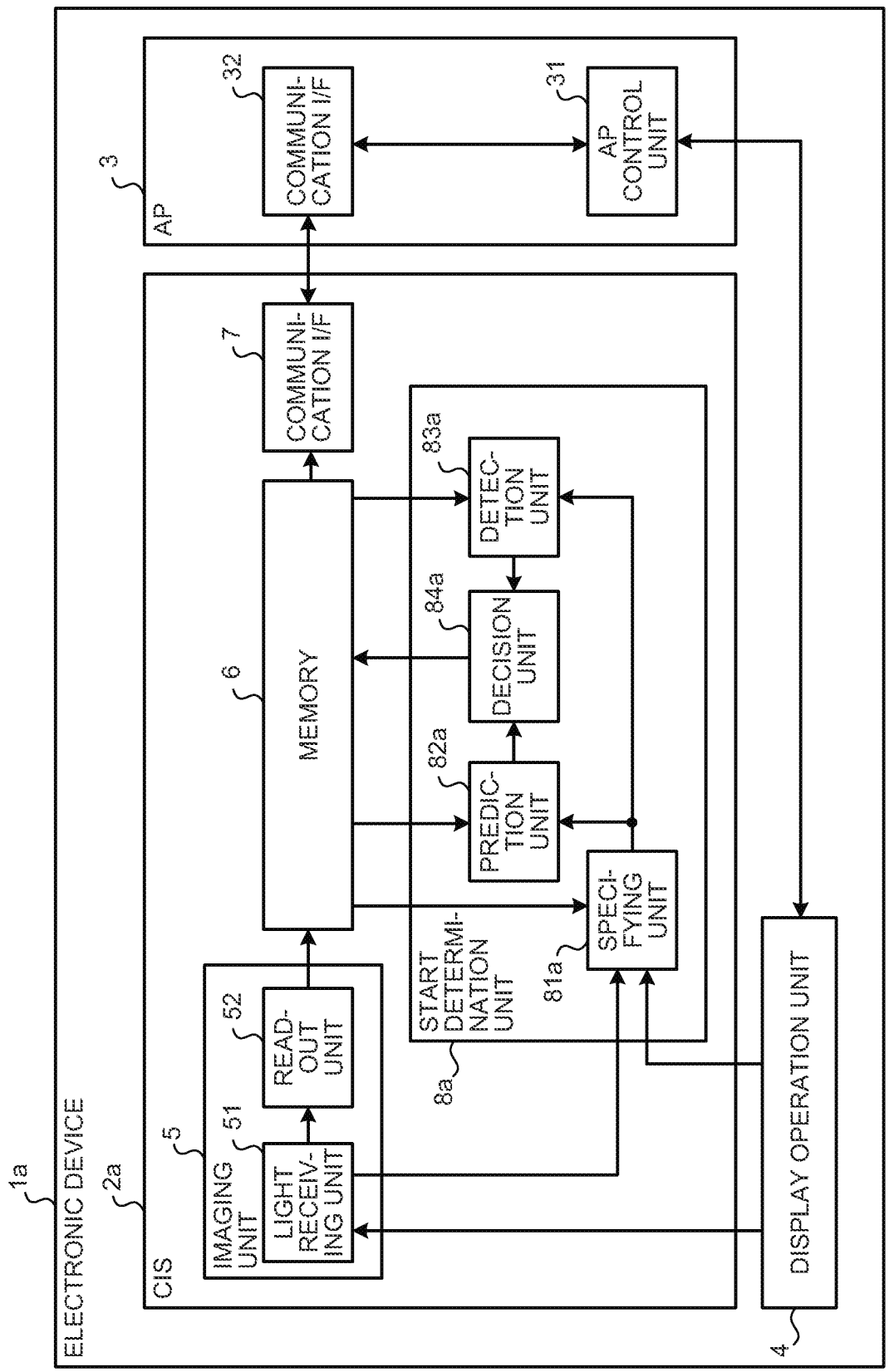
FIG. 6 is a block diagram illustrating a schematic configuration example of an electronic device according to a second embodiment.

FIG. 6 is a block diagram illustrating a configuration example of an electronic device according to a second embodiment. As illustrated in FIG. 6, in an electronic device 1a according to the second embodiment, the configuration in which the imaging unit 5 in a CIS 2a outputs and stores image data of the captured image to the memory 6 and the configuration of a start determination unit 8a are different from those of the electronic device 1 illustrated in FIG. 1, while the other configurations are the same as those illustrated in FIG. 1.

Therefore, here, the operation of the imaging unit 5 and the configuration and operation of the start determination unit 8a will be described, and duplicate description will be omitted for the other configurations. The imaging unit 5 of the CIS 2a sequentially outputs and stores the image data captured at high speed, to the memory 6.

The start determination unit 8a includes a specifying unit 81a, a prediction unit 82a, a detection unit 83a, and a decision unit 84a. The specifying unit 81a acquires image data from the memory 6 and specifies a subject based on the image data by a DNN, for example. The specifying unit 81a then outputs information indicating the position of the subject in the image to the prediction unit 82a and the detection unit 83a.

The prediction unit 82a acquires image data in time series from the memory 6, and predicts the moving direction of the subject by DNN processing using a DNN. The prediction unit 82a outputs information indicating the predicted moving direction of the subject to the decision unit 84a.

The detection unit 83a acquires image data in time series from the memory 6, detects motions of the subject based on the image data in time series, and outputs information indicating the motion of the subject (including the amount of motion and the moving direction) to the decision unit 84a.

The decision unit 84a decides the image data to be saved in the memory 6 (to be kept without being erased) based on the information input from the prediction unit 82a and the detection unit 83a. The decision unit 84a decides the image data in which the motion matching the moving direction of the subject predicted by the prediction unit 82a has been detected by the detection unit 83a, as the image data to be saved in the memory 6.

Furthermore, the decision unit 84a decides the image data in which the motion matching the moving direction of the subject predicted by the prediction unit 82a has not been detected by the detection unit 83a as the image not to be saved in the memory 6 and erases the image data from the memory 6.

Therefore, the memory 6 does not store, for example, image data that has no motion of subject due to early timing of starting high speed imaging by the user and that thus need not to be captured by high speed imaging, or image data in which the subject has moved in a direction different from the direction predicted by the prediction unit 82*a* due to camera shake or the like.

By contrast, the memory 6 stores image data in which the subject moves in a direction that matches the direction predicted by the prediction unit 82*a*, the image data the user is likely to desire to be captured with high speed imaging. With this configuration, the CIS 2*a* can image the motion of the subject at a moment desired by the user even when the user's operation for starting high speed imaging is too early.

[2-2. Operation of Electronic Device According to Second Embodiment]

Next, operations of the CIS according to the present disclosure will be described with reference to FIG. 7. FIG. 7 is an operation diagram of the CIS according to the present disclosure. Although FIG. 2 illustrates two memories 6 to simplify the operations of CIS 2*a*, the two memories 6 in FIG. 2 are physically identical.

As illustrated in FIG. 7, before starting high speed imaging, the CIS 2*a* initially specifies a subject from a preview image Pre by the start determination unit 8 (step S11). Thereafter, having received a high speed imaging trigger and started high speed imaging, the CIS 2 outputs the image data obtained in the high speed imaging from the imaging unit 5 to the memory 6 so as to store the image data in the memory 6 (step S12).

Subsequently, the start determination unit 8 reads out image data from the memory 6 (step S13). The start determination unit 8 then decides the image data to be saved in the memory 6 based on the image data after being stored in the memory 6 (step S14). At this time, the start determination unit 8 decides that the image data in which the moving direction of the subject matches the predicted direction, as the image data to be saved in the memory 6.

Furthermore, when there is no motion in the subject in the image at the beginning of high speed imaging due to early operation timing of starting the high speed imaging by the user, or when the moving direction of the subject is different from the predicted direction, the start determination unit 8 decides these pieces of image data as image data that is not be saved.

Then, the start determination unit 8 erases the image data decided not to be saved, from the memory 6 (step S15). With this configuration, recording is started in the memory 6, from the image data determined to be saved in the memory 6 by the start determination unit 8 (step S16).

In this manner the, CIS 2 would erase from the memory 6 the image data that needs no high speed imaging, such as image data in which there is no motion of subject in the image at the beginning of high speed imaging, making it possible to effectively use the storage capacity of the memory 6 for the image data that the user desires to capture with high speed imaging, by the unrecorded amount.

In addition, when the image obtained by high speed imaging is to be displayed on the display operation unit 4, the CIS 2 outputs the image data from the memory 6 to the communication I/F 32 of the AP 3 via the communication I/F 7 of the CIS 2 (step S17).

With this operation, by displaying the image data captured by high speed imaging input from the CIS 2 on the display operation unit 4 at a frame rate lower than an imaging rate, the AP 3 is capable of performing super slow playback of the image that has captured the motion of the subject at a moment desired by the user in the motions of the subject.

3. Other Embodiments

The processes according to each of embodiments described above may be performed in various different forms (modifications) in addition to each of the embodiments described above.

For example, although the above-described embodiments are an exemplary case where there is one moving object in the captured image, the specifying unit 81, 81*a* can also specify a moving object that the user is likely to desire to image as a subject in the presence of a plurality of moving objects in a captured image.

For example, a camera user is likely to fit the subject to be imaged in the center of the image. Therefore, the specifying unit 81, 81*a* specifies an object in the center of the image, as a subject. With this configuration, the specifying units 81, 81*a* can identify a moving object that the user is likely to want to capture as a subject when a plurality of moving objects are present in the captured image.

In addition, the specifying unit 81, 81*a* specifies an object selected from the image by the user, as a subject. In such a case, the specifying unit 81 specifies, for example, an object selected by a touch operation by the user, as a subject in the preview image displayed on the display operation unit 4. With this operation, the specifying unit 81, 81*a* can specify the moving object as a subject even when the moving object that the user desires to image is captured at a position other than the center of the image, for example.

Note that the specifying unit 81, 81*a* can also exclude an object selected from the image by the user, from the target to be specified as a subject. With this configuration, when the subject automatically specified by the specifying unit 81, 81*a* is not an object intended by the user, the user can exclude the object from the target to be specified by the specifying unit 81, 81*a* as a subject, by performing an operation of selecting the specified object displayed on the display operation unit 4.

In addition, usually, when the AF function is operating, the user of the camera generally does not release the shutter until the desired object for imaging is in focus. Therefore, when the AF function is operating, the specifying unit 81, 81*a* specifies the object closest to the autofocus point as a subject. With this operation, the specifying unit 81, 81*a* is capable of specifying a moving object that the user is likely to desire to image, as the subject.

Furthermore, the CIS 2, 2*a* can include a storage unit that stores image data of an object to be specified as a subject respectively by the specifying unit 81, 81*a*. In such a case, the CIS 2, 2*a* allows the user to preliminarily register and store the image data of the person's face or object as a candidate for the subject in the storage unit.

The specifying unit 81, 81*a* then specifies a subject based on the image data stored in the storage unit. For example, the specifying unit 81, 81*a* acquires a feature amount of each of divided regions obtained by dividing a captured image, calculates a score indicating the similarity between the feature amount acquired from the captured image and the feature amount of the image data stored in the storage so as to specify the object in the divided regions with a high score, as the subject. With this operation, the specifying unit 81, 81*a* can specify an object whose image data is likely to have been pre-registered by the user, as the subject.

Furthermore, the CIS 2, 2*a* has a plurality of modes in which the type of an object to be specified as a subject is mutually different. The specifying unit 81, 81a specifies the object according to the mode, as a subject. For example, the specifying unit 81, 81a specifies only a person as the subject when a sports mode is selected by the user, and registers only an animal as the subject when an animal mode is selected. This enables the specifying unit 81, 81a to specify an arbitrary object included in the type desired by the user, rather than a specific object, as the subject.

In addition, the specifying unit 81, 81a can also include artificial intelligence (AI) that estimates an object that is highly likely to move in a captured image. In such a case, the specifying unit 81, 81a specifies an object judged by the AI to be most highly likely to move, as a subject. With this configuration, the specifying unit 81, 81a can specify an object that is highly likely to move that the user desires to image, as the subject even when the user does not select a mode or specify an object.

Furthermore, when the image contains a plurality of persons, the specifying unit 81, 81a decides a person to be specified as a subject based on at least one of the age or gender of the captured person. For example, the specifying unit 81, 81a decides a person to be specified as the subject, with a high priority for children, a medium priority for women, and a low priority for men. The priority setting for age and gender can be changed arbitrarily. With this configuration, the specifying unit 81, 81a can specify a person according to the preference of the user, as the subject.

Furthermore, in general, a user who desires to capture a big moment of a subject tends to place the subject within the angle of view even before starting high speed imaging. In view of this, the specifying unit 81, 81a specifies an object that is continuously present in a preview image for a predetermined time or longer, as the subject. With this operation, the specifying unit 81, 81a can specify a moving object that the user is likely to desire to image at a big moment, as the subject.

While the above-described embodiment is a case where the CIS 2, 2a respectively includes the specifying unit 81, 81a, the specifying unit 81, 81a may be provided on the AP 3 side. In such a case, the CIS 2, 2a outputs the image stored in the memory 6 to the AP 3, acquires the subject specified by the specifying unit 81, 81a provided in the AP 3 from the AP 3, and decides the image data to be saved in the memory 6 by a procedure similar to the above procedure.

However, when the specifying units 81, 81a is provided on the AP 3 side, it would be necessary to output the image data captured at high speed by the imaging unit 5 to the AP 3, increasing the power consumption of the CIS 2, 2a, respectively. In view of this, it is desirable to provide the specifying unit 81, 81a on the CIS 2, 2a side, respectively.

The processing procedures, control procedures, specific names, and information including various data and parameters illustrated in the above specifications or drawings can be changed in any manner unless otherwise specified. In addition, the specific examples, distributions, numerical values or the like described in the examples are merely examples and can be arbitrarily changed.

In addition, each of components of each of devices is provided as a functional and conceptional illustration and thus does not necessarily need to be physically configured as illustrated. That is, the specific form of distribution/integration of each of devices is not limited to those illustrated in the drawings, and all or a part thereof may be functionally or physically distributed or integrated into arbitrary units according to various loads and use conditions. For example, the specifying unit 81, the prediction unit 82, the detection unit 83, and the decision unit 84 illustrated in FIG. 1 may be integrated.

Furthermore, the above-described embodiments and modifications can be appropriately combined within a range implementable without contradiction of processes.

4. Effects

The CIS 2, 2a includes the imaging unit 5, the memory 6, and the decision unit 84, 84a, respectively. The imaging unit 5 continuously captures images of a subject to generate image data. The memory 6 stores image data. The detection units 83, 83a detects motions of the subject based on the image data. The decision unit 84, 84a decides the image data in which the motion of the subject in a direction matching the moving direction of the subject predicted based on the image data has been detected by the detection unit 83, 83a respectively, as the image data to be saved in the memory 6.

With this configuration, by selectively storing the image data decided to be saved by the decision unit 84, 84a in the memory 6 among all the image data, the CIS 2, 2a can ensure a free region in the memory 6 and can image the motion of the subject at a moment desired by the user in the motions of the subject.

Furthermore, the decision unit 84 decides the image data to be saved in the memory 6 based on the image data before being stored in the memory 6, and stores and saves the image data decided to be saved in the memory 6 With this configuration, the CIS 2 can ensure a free region in the memory 6 before storing the image data in the memory 6.

Furthermore, the decision unit 84a decides the image data to be saved in the memory 6 based on the image data after being stored in the memory 6, and erases the image data other than the image data decided to be saved, from the memory 6. With this configuration, the CIS 2a can ensure a free region in the memory 6 after storing the image data in the memory 6.

In addition, the CIS 2, 2a includes the prediction unit 82, 82a respectively that predicts the moving direction of the subject based on the image data. With this configuration, in a case where the prediction unit 82, 82a is provided outside the CIS 2, 2a, respectively, for example, the CIS 2, 2a would need to output image data to the external prediction unit 82, 82a, which increases power consumption. Fortunately, however, with this configuration that internally includes the specifying unit 81, 81a, it is possible to reduce the power consumption.

In addition, the prediction units 82, 82a predicts the moving direction of the subject by DNN processing using a DNN. With this configuration, the prediction units 82, 82a can accurately predict the moving direction of the subject.

Furthermore, the CIS 2, 2a has a specifying unit 81, 81a respectively that specifies a subject from image data. With this configuration, the prediction units 82, 82a can predict the moving direction of the subject that the user is likely to desire to image in the presence of a plurality of moving objects in a captured image. In addition, the detection unit 83, 83a can detect the motion of a subject that the user is likely to desire to capture in the presence of a plurality of moving objects in the captured image.

In addition, the specifying unit 81, 81a specifies an object in the center of the image, as a subject. With this configuration, the specifying units 81, 81a can identify a moving object that the user is likely to want to capture as a subject when a plurality of moving objects are present in the captured image.

In addition, the specifying unit 81, 81a specifies an object selected from the image by the user, as a subject. With this configuration, the specifying unit 81, 81a can specify the moving object as the subject even when the moving object that the user desires to image is captured at a position other than the center of the image.

In addition, the specifying unit 81, 81a excludes an object selected from the image by the user, from the target to be specified as a subject. With this procedure, the specifying unit 81, 81a can exclude the automatically specified subject from the subject candidates when the automatically specified subject is not an object intended by the user.

In addition, the specifying unit 81, 81a specifies an object close to the focus point of autofocus, as a subject. With this procedure, the specifying unit 81, 81a can specify a moving object that the user who starts high speed imaging is likely to desire to image, as the subject, when the object comes in focus.

Furthermore, the CIS 2, 2a includes the storage unit that stores image data of an object to be specified as a subject by the specifying unit 81, 81a. The specifying unit 81, 81a specifies the subject based on the image data stored in the storage unit. With this operation, the specifying unit 81, 81a can specify an object whose image data is likely to have been pre-registered by the user, as the subject.

In addition, the CIS 2, 2a has a plurality of modes in which the type of the object to be specified as a subject by the specifying unit 81, 81a is mutually different. The specifying unit 81, 81a specifies an object according to the mode, as the subject. This enables the specifying unit 81, 81a to specify an arbitrary object included in the type desired by the user, rather than a specific object, as the subject.

The specifying unit 81, 81a specifies an object that is judged to be highly likely to move in the image by artificial intelligence, as a subject. With this configuration, the specifying unit 81, 81a can specify an object that is highly likely to move that the user desires to image, as the subject even when the user does not select a mode or specify an object.

Furthermore, when the image contains a plurality of persons, the specifying unit 81, 81a decides the person to be specified as a subject based on age and/or gender of the person. With this configuration, the specifying unit 81, 81a can specify a person according to the preference of the user, as the subject.

The specifying unit 81, 81a specifies an object that is continuously present for a predetermined time or more in a preview image captured by the imaging unit 5 before the high speed imaging performed by the imaging unit 5 is started, as a subject. With this operation, the specifying unit 81, 81a can specify a moving object that the user is likely to desire to image at a big moment, as the subject.

Furthermore, the electronic device 1, 1a respectively includes the CIS 2, 2a. The CIS 2, 2a includes the imaging unit 5, the memory 6, the detection unit 83, 83a, and the decision unit 84, 84a, respectively. The imaging unit 5 continuously captures images of a subject to generate image data. The memory 6 stores image data. The detection units 83, 83a detects motions of the subject based on the image data. The decision unit 84, 84a decides the image data in which the motion of the subject in a direction matching the moving direction of the subject predicted based on the image data has been detected by the detection unit 83, 83a respectively, as the image data to be saved in the memory.

With this configuration, by selectively storing the image data decided to be saved by the decision unit 84, 84a in the memory 6 among all the image data, the CIS 2, 2a can ensure a free region in the memory 6 and can image the motion of the subject at a moment desired by the user in the motions of the subject.

In addition, the CIS 2, 2a continuously captures images of a subject to generate image data, detects motions of the subject based on the image data, and decides the image data in which the motion of the subject matching the moving direction of the subject predicted based on the image data has been detected, as the image data to be saved in the memory 6. With this operation, the CIS 2, 2a can capture the motion of the subject at the moment desired by the user in the motions of the subject.

The effects described in the present specification are merely examples, and thus, there may be other effects, not limited to the exemplified effects.

Note that the present technology can also have the following configurations.

(1)
An imaging device including:
an imaging unit that continuously captures images of a subject to generate image data;
a memory that stores the image data;
a detection unit that detects motions of the subject based on the image data; and
a decision unit that decides image data in which a motion of the subject in a direction matching a moving direction of the subject predicted based on the image data has been detected by the detection unit, as image data to be saved in the memory.

(2)
The imaging device according to (1),
wherein the decision unit
decides the image data to be saved in the memory based on the image data before being stored in the memory, and stores and saves the image data decided to be saved, in the memory.

(3)
The imaging device according to (1),
wherein the decision unit
decides the image data to be saved in the memory based on the image data after being stored in the memory, and erases the image data other than the image data decided to be saved, from the memory.

(4)
The imaging device according to (1), further including
a prediction unit that predicts the moving direction of the subject based on the image data.

(5)
The imaging device according to (4),
wherein the prediction unit
predicts the moving direction of the subject by DNN processing using a Deep Neural Network (DNN). Neural (6)
The imaging device according to (1), further including
a specifying unit that specifies the subject from the image data.

(7)
The imaging device according to (6),
wherein the specifying unit
specifies an object in a center of the image, as a subject.

(8)
The imaging device according to (6),
wherein the specifying unit
specifies an object selected from the image by a user, as the subject.

(9)
The imaging device according to (6),
wherein the specifying unit
excludes an object selected from the image by a user, from a target to be specified as the subject.
(10)
The imaging device according to (6),
wherein the specifying unit
specifies an object close to a focus point of autofocus, as a subject.
(11)
The imaging device according to (6), further including
a storage unit that stores image data of an object to be specified as the subject by the specifying unit,
wherein the specifying unit
specifies a subject based on the image data stored in the storage unit.
(12)
The imaging device according to (6),
wherein the imaging device has a plurality of modes in which a type of an object to be specified as a subject by the specifying unit is mutually different, and
the specifying unit
specifies an object according to the mode as a subject.
(13)
The imaging device according to (6),
wherein the specifying unit
specifies an object that is judged to be highly likely to move in the image by artificial intelligence, as a subject.
(14)
The imaging device according to (6),
wherein, when the image contains a plurality of persons, the specifying unit
decides the person to be specified as a subject based on age and/or gender of the person.
(15)
The imaging device according to (6),
wherein the specifying unit
specifies an object that is continuously present for a predetermined time or more in a preview image captured by the imaging unit before high speed imaging performed by the imaging unit is started, as a subject.
(16)
An electronic device including
an imaging device including:
an imaging unit that continuously captures images of a subject to generate image data;
a memory that stores the image data;
a detection unit that detects motions of the subject based on the image data; and
a decision unit that decides image data in which a motion of the subject in a direction matching a moving direction of the subject predicted based on the image data has been detected by the detection unit, as image data to be saved in the memory.
(17)
An imaging method including:
continuously capturing images of a subject to generate image data;
detecting a motion of the subject based on the image data; and
deciding image data in which the motion of the subject matching a moving direction of the subject predicted based on the image data has been detected, as image data to be saved in a memory.

REFERENCE SIGNS LIST 1, 1a ELECTRONIC DEVICE
2, 2a CIS
3 AP
31 AP CONTROL UNIT
32 COMMUNICATION I/F
4 DISPLAY OPERATION UNIT
5 IMAGING UNIT
51 LIGHT RECEIVING UNIT
52 READOUT UNIT
6 MEMORY
7 COMMUNICATION I/F
8, 8a START DETERMINATION UNIT
81, 81a SPECIFYING UNIT
82, 82a PREDICTION UNIT
83, 83a DETECTION UNIT
84, 84a DECISION UNIT

The invention claimed is:

1. An imaging device, comprising:
an imaging sensor configured to capture a plurality of images of a subject to generate a plurality of pieces of image data;
a memory configured to store the plurality of pieces of image data; and
a processor configured to:
    detect motions of the subject based on the plurality of pieces of image data; and
    decide a piece of image data from the plurality of pieces of image data to be saved in the memory, wherein a moving direction of the subject in the decided piece of image data matches a moving direction of the subject predicted based on the plurality of pieces of image data.

2. The imaging device according to claim 1, wherein the processor is further configured to:
decide the piece of image data to be saved in the memory based on the plurality of pieces of image data before being stored in the memory; and
store and save the piece of image data decided to be saved, in the memory.

3. The imaging device according to claim 1, wherein the processor is further configured to:
decide the piece of image data to be saved in the memory based on the plurality of pieces of image data after being stored in the memory; and
erase image data other than the piece of image data decided to be saved, from the memory.

4. The imaging device according to claim 1, wherein the processor is further configured to predict the moving direction of the subject based on the plurality of pieces of image data.

5. The imaging device according to claim 4, wherein the processor is further configured to predict the moving direction of the subject by DNN processing based on a Deep Neural Network (DNN).

6. The imaging device according to claim 1, wherein the processor is further configured to specify the subject from the plurality of pieces of image data.

7. The imaging device according to claim 6, wherein the processor is further configured to specify an object in a center of each of the plurality of images, as a corresponding subject.

8. The imaging device according to claim 6, wherein the processor is further configured to specify an object selected from the plurality of images by a user, as the subject.

9. The imaging device according to claim 6, wherein the processor is further configured to exclude an object selected from the plurality of images by a user, from a target to be specified as the subject.

10. The imaging device according to claim 6, wherein the processor is further configured to specify an object close to a focus point of autofocus, as the subject.

11. The imaging device according to claim 6, further comprising
a storage device configured to store image data of an object to be specified as the subject, wherein the processor is further configured to specify a subject based on the image data stored in the storage device.

12. The imaging device according to claim 6, wherein
the imaging device has a plurality of modes in which a type of an object to be specified as the subject is mutually different, and
the processor is further configured to specify, based on a mode of the plurality of modes, the object as the subject.

13. The imaging device according to claim 6, wherein the processor is further configured to specify an object that is judged to be highly likely to move in each of the plurality of images by artificial intelligence, as the subject.

14. The imaging device according to claim 6, wherein,
based on a presence of a plurality of persons in the plurality of images, the processor is further configured to decide a person from the plurality of persons to be specified as the subject based on at least one of an age or gender of the person.

15. The imaging device according to claim 6, wherein the processor is further configured to specify an object that is continuously present for a specific time or more in a preview image captured by the imaging sensor before high speed imaging performed by the imaging sensor is started, as the subject.

16. An electronic device, comprising:
an imaging device including:
an imaging sensor configured to capture a plurality of images of a subject to generate a plurality of pieces of image data;
a memory configured to store the plurality of pieces of image data; and
a processor configured to:
detect motions of the subject based on the plurality of pieces of image data; and
decide a piece of image data from the plurality of pieces of image data to be saved in the memory, wherein a moving direction of the subject in the decided piece of image data matches a moving direction of the subject predicted based on the plurality of pieces of image data.

17. An imaging method, comprising:
capturing a plurality of images of a subject to generate a plurality of pieces of image data;
detecting motions of the subject based on the plurality of pieces of image data; and
deciding a piece of image data from the plurality of pieces of image data to be saved in the memory, wherein a moving direction of the subject in the determined piece of image data matches a moving direction of the subject predicted based on the plurality of pieces of image data.

* * * * *